US012749880B2

(12) United States Patent

Lassen et al.

(10) Patent No.: US 12,749,880 B2

(45) Date of Patent: Sep. 29, 2026

(54) JUNCTION BOX WITH REMOVABLE MOUNTING PLATE

(71) Applicant: Elemental LED, Inc., Reno, NV (US)

(72) Inventors: Andrew Lassen, Reno, NV (US); Robert Green, Reno, NV (US); David Greenspan, Reno, NV (US); Katja Rodgers, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 178 days.

(21) Appl. No.: 18/815,719

(22) Filed: Aug. 26, 2024

(65) Prior Publication Data

US 2026/0058449 A1 Feb. 26, 2026

(51) Int. Cl.
*H02G 3/08* (2006.01)

(52) U.S. Cl.
CPC .................................. *H02G 3/081* (2013.01)

(58) Field of Classification Search
CPC ...................................................... H02G 3/081
See application file for complete search history.

(56) References Cited

U.S. PATENT DOCUMENTS

| | | | | |
|---|---|---|---|---|
| 9,951,934 B2 | 4/2018 | Buck et al. | | |
| 10,116,127 B1 | 10/2018 | Lopez-Martinez et al. | | |
| 10,855,065 B1 | 12/2020 | Lassen et al. | | |
| 2002/0168882 A1* | 11/2002 | Chiriku ................ | H01R 9/2466 | 439/76.2 |
| 2013/0203285 A1* | 8/2013 | Solon ................... | H01R 13/514 | 439/540.1 |
| 2014/0331741 A1* | 11/2014 | Shah ................... | H04M 1/0277 | 73/12.06 |
| 2017/0268758 A1* | 9/2017 | Buck ..................... | F21V 23/001 | |
| 2018/0209624 A1 | 7/2018 | Buck et al. | | |
| 2018/0248347 A1* | 8/2018 | Pappas ................... | H02G 3/081 | |
| 2022/0337048 A1* | 10/2022 | Liu .......................... | H02H 1/04 | |

FOREIGN PATENT DOCUMENTS

| | | | |
|---|---|---|---|
| KR | 200176380 | Y1 | 3/2000 |
| KR | 200401184 | Y1 | 11/2005 |
| KR | 100604205 | B1 | 7/2006 |
| KR | 101010309 | B1 | 1/2011 |

OTHER PUBLICATIONS

International Search Report and Written Opinion for Corresponding Application PCT/US2025/043270, mailed Dec. 18, 2025.

* cited by examiner

*Primary Examiner* — Timothy J Thompson
*Assistant Examiner* — Obaidul Gani
(74) *Attorney, Agent, or Firm* — Andrew McAleavey; Patentbest

(57) ABSTRACT

A junction box has a base enclosure, a mounting plate, and a lid. The base enclosure has a back and a sidewall or plurality of sidewalls arising from respective edges of the back, thereby defining an opening. The mounting plate is adapted to be removably mounted within, and removed from, the base enclosure. The mounting plate includes at least one set of mutually parallel mounting slots extending across substantially the entirety of the mounting plate along a first direction, and a divider extending outwardly from the mounting plate. The divider is positioned to one side of the at least one set of mounting slots. The lid is adapted to be installed over the base enclosure to close the opening therein. A method of using the junction box is also disclosed.

26 Claims, 4 Drawing Sheets

JUNCTION BOX WITH REMOVABLE MOUNTING PLATE

TECHNICAL FIELD

Embodiments of the invention relate to junction boxes with removable mounting plates, and more specifically, to junction boxes for LED drivers.

BACKGROUND

Lighting based on light-emitting diodes (LEDs) has almost entirely supplanted many traditional types of lighting, including many incandescent lamps and even some types of fluorescent lighting fixtures. In general, LED-based lighting can offer better light quality with a variety of color temperatures and colors. LED-based lighting also generally offers some energy efficiencies when compared with traditional lighting.

Yet LED-based lighting does have its drawbacks. One drawback is that while household and commercial power systems use high-voltage, alternating current (AC) power, most LEDs are designed to accept low-voltage, direct current (DC) power. Thus, in order to accept household or commercial power, LED lighting systems must be equipped with a driver, a component that accepts power in a first form, changes the form of the power in some way, and outputs the power in a second form, different than the first. The most common drivers accept high-voltage AC power and output low-voltage DC power. One of the most common driver architectures is the switched-mode power supply.

Although drivers are ubiquitous, they do have a number of disadvantages. One disadvantage is power loss-drivers are not 100% efficient, which means that some input power is lost when they are used, usually in the form of heat. Thus, drivers get hot, especially when the driver is handling an electrical load that is near its capacity. Given the heat and the potential for sparks whenever there is an electrical connection or junction, drivers can pose fire risks.

In some jurisdictions, including the United States, high-voltage electrical connections must be made within a fire-resistant or fireproof enclosure, which is typically referred to as a junction box. U.S. Pat. Nos. 9,951,934 and 10,116,127 provide examples of junction boxes specifically designed for use with drivers. While these junction boxes serve their purpose, they can still be difficult to use in practice.

BRIEF SUMMARY

One aspect of the present invention relates to a junction box. The junction box has a base enclosure, a mounting plate, and a lid. The base enclosure has a back and a sidewall or plurality of sidewalls arising from respective edges of the back, thereby defining an opening. The mounting plate is adapted to be removably mounted within, and removed from, the base enclosure. The mounting plate includes at least one set of mutually parallel mounting slots extending across substantially the entirety of the mounting plate along a first direction, and a divider extending outwardly from the mounting plate. The divider is positioned to one side of the at least one set of mounting slots. The lid is adapted to be installed over the base enclosure to close the opening therein.

Another aspect of the invention relates to a method. The method comprises installing one or more drivers by securing the drivers with securing structure in at least one set of mutually parallel mounting slots that extend substantially the entirety of a mounting plate along a first direction. The method also comprises mounting the mounting plate within a base enclosure of a junction box. The base enclosure has a back and a sidewall or plurality of sidewalls arising from respective edges of the back, thereby defining an opening.

Other aspects, features, and advantages of embodiments of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
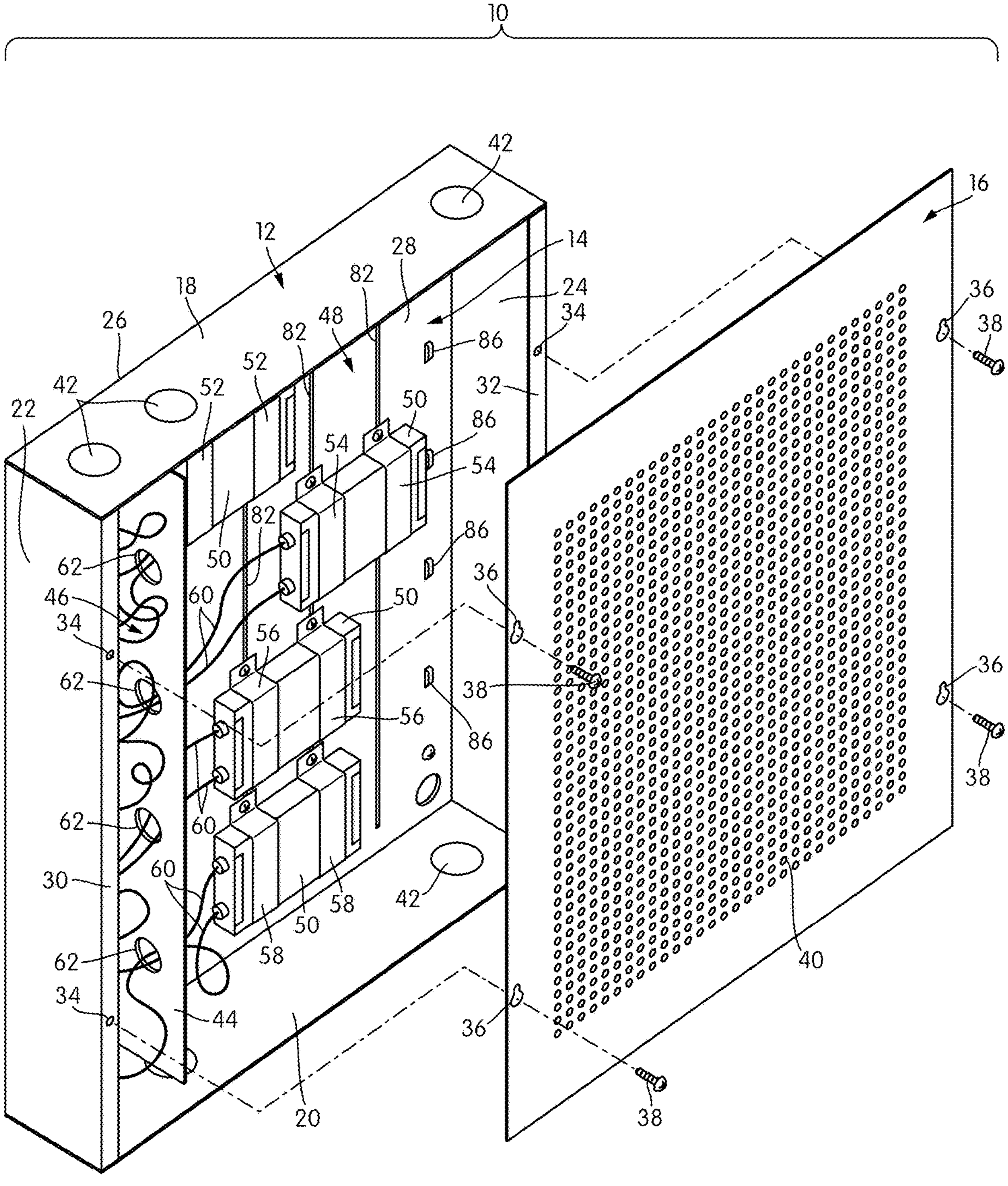
FIG. 1 is a perspective view of a junction box according to one embodiment of the invention, shown with its cover exploded away to reveal its interior contents.

FIG. 1 is a perspective view of a junction box, generally indicated at 10, according to one embodiment of the invention. The junction box 10 has three parts: a base enclosure 12, a mounting plate 14 adapted to be secured within the base enclosure 12, and a lid 16 that is adapted to be secured to the base enclosure 12 to cover and close the base enclosure 12.

In this description, directional terms like "top," "bottom," "left," "right," "front," and "back" are used with respect to the coordinate system of the drawing figures. As will be described in more detail below, the junction box 10 may be used and mounted in any of a number of different orientations, thus, directions may vary considerably in use.

As can be seen in FIG. 1, the base enclosure 12 has a five-sided rectilinear shape, with four sidewalls 18, 20, 22, 24 and a bottom or back 26. In this embodiment, sidewalls opposite one another are mirror images of one another. That is, opposite sidewalls 18 and 20 are mirror images of one another, as are opposite sidewalls 22 and 24. All of the sidewalls 18, 20, 22, 24 arise and extend outwardly from the back 26, leaving an opening 28 nearly the size of the back 26 that is closed by the lid 16. The opening 28 is rectangular in the illustrated embodiment.

More specifically, each of two opposite, mirror image sidewalls 22, 24 forms an inwardly-extending lip 30, 32. Each lip 30, 32 has at least one fastener opening 34, and in FIG. 1, each lip 30, 32 has two fastener openings 34 spaced from one another along the lip 30, 32. The fastener openings 34 may be threaded or unthreaded, although in the illustrated embodiment, they are threaded.

The lid 16 has complementary openings 36 positioned to coincide with the fastener openings 34 in the lips 30, 32. In the embodiment of FIG. 1, these are keyhole openings, i.e., they have a larger portion and a smaller portion. As one example of an installation procedure, fasteners 38, machine screws in this case, may be inserted into the fastener openings 34 in the lips 30, 32 of the base enclosure 12 and partially secured. The lid 16 may be placed onto the partially-secured fasteners 38 via the larger portion of the keyhole openings 36 in the lid 16 and then moved into place before the fasteners 38 are fully tightened.

Generally speaking, the means by which the lid 16 is connected to the base enclosure 12 is immaterial, so long as the lid 16 allows access to the interior of the junction box 10 when necessary and closes the junction box 10 for use. In other embodiments, the lid may be, e.g., slid into a channel defined in the upper sidewalls and secured to a third sidewall with a single fastener, permanently hingedly connected to a single sidewall, etc.

The lid 16 of FIG. 1 has a perforated area 40 that may aid in heat dissipation while the junction box 10 is in use. However, as those of skill in the art will appreciate, the use of openings and perforations, and the manner in which the sidewalls 18, 20, 22, 24 are or are not connected with one another, will depend on the environment or environments in which the junction box 10 is designed to be used, and any ingress protection (IP) rating that the junction box 10 is designed to have. For example, in the illustrated embodiment, the edges of the sidewalls 18, 20, 22, 24 lie in close approximation to one another, but the edges are not connected to one another. If, in another embodiment, the junction box 10 is designed for greater ingress protection, the sidewalls 18, 20, 22, 24 could be brazed or welded together, or otherwise made contiguous. Embodiments designed for greater ingress protection would also typically omit perforated areas 40. U.S. Pat. No. 10,855,065, the work of the present assignee, describes a weather-resistant junction box. The junction box 10 can be adapted for weather-resistance as described in that patent.

For purposes of both ingress protection and fire protection, as was noted above, the edges of the sidewalls 18, 20, 22, 24 lie in close approximation to one another (i.e., they are closely adjacent to one another), and the sidewalls 18, 20, 22, 24 do not have any large gaps in them. As will be described below in more detail, in use, the junction box 10 will have openings through which cables and wiring can enter and leave. However, in its initial state, the junction box 10 has a plurality of knock outs 42 in each of two sidewalls 18, 20. The knock outs 42 are places where the sidewall 18, 20 has a frangible portion that can be removed to create an opening. When the junction box 10 is being prepared for use, selected knock outs 42 are removed. In the illustrated embodiment, the knock outs 42 are round and produce round openings, but various shapes and types of openings may be used in other embodiments.

The junction box 10 in the illustrated embodiment has an internal dividing wall 44 that partitions a smaller connection compartment 46 from a larger main compartment 48. A plurality of drivers 50 are located in the main compartment 48, secured to the mounting plate 14 with U-brackets 52, 54, 56, 58 in a manner that will be described below in more detail. Wires from the drivers 50, indicated generally at 60, extend through openings 62 in the dividing wall 44 into the connection compartment 46. In other embodiments, instead of openings 62, knock-outs may be provided to create openings where needed.

In some jurisdictions, high-voltage wiring connections must be separated from low-voltage wiring connections. Thus, the connection compartment 46 provides a dedicated space for making high-voltage connections. (For purposes of this description, the phrase "high voltage" refers to any voltage over about 50V.) Generally speaking, these high-voltage connections will be connections between an incoming high-voltage supply line (not shown in the figures) and the wires 60 that carry high-voltage power to the drivers 50 to allow them to do their work. In some cases, another compartment may be defined within the junction box 10 in which low-voltage connections may be made (i.e., between the drivers 50 and the low-voltage cables that exit the junction box 10 to power LED lighting). However, most jurisdictions do not require a separate compartment for low-voltage connections.

Figure 2:
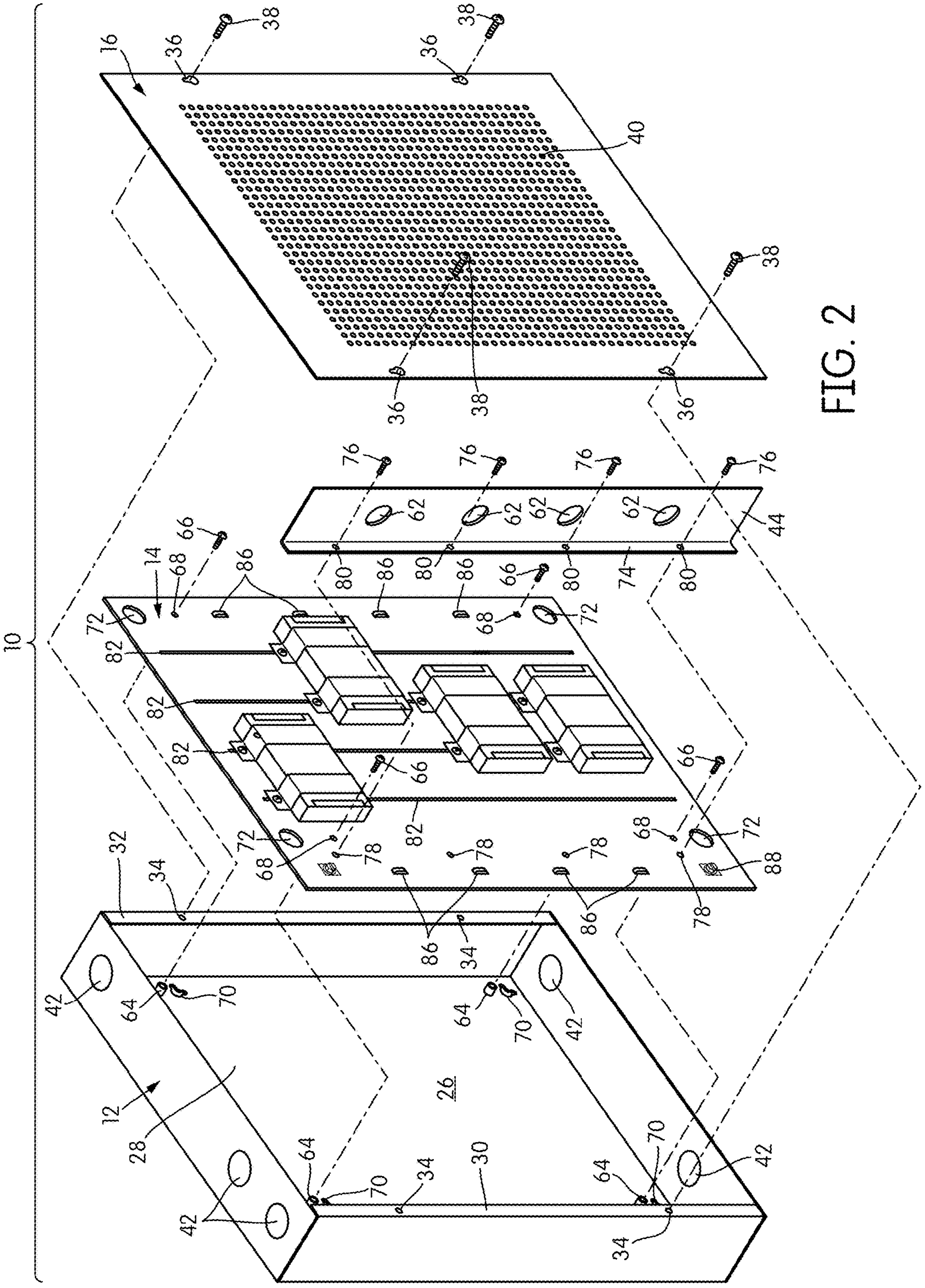
FIG. 2 is an exploded perspective view of the junction box of FIG. 1.

The junction box 10 has features that make it easier to install and configure. Notably, the mounting plate 14 is removably secured to the base enclosure 12. FIG. 2 is a perspective view of the junction box 10 with the mounting plate 14 exploded out of the base enclosure 12. As shown, the mounting plate 14 is secured to four stand-offs 64 positioned near respective corners of the base enclosure 12. Each stand-off 64 has a threaded opening to receive a fastener 66, which inserts through a complementarily-positioned opening 68 in the mounting plate 14.

The removable mounting plate 14 allows an installer to pre-install drivers 50 on the mounting plate 14 before mounting the mounting plate within the base enclosure 12. Pre-installing drivers 50 outside of the confines of the base enclosure 12 allows an installer to access the mounting plate 14 from all sides, without the encumbrance of the sidewalls 18, 20, 22, 24 to obstruct the process, and then install the mounting plate 14 in the base enclosure 12.

The junction box 10 is configured so that the base enclosure 12 can be mounted in its desired location before the mounting plate 14 is installed. Specifically, the base enclosure 12 includes external mounting structure, in this case, two-position keyhole openings 70 near the respective corners of the back 26. The two-position keyhole openings 70 allow fasteners (not shown) to be placed, the base enclosure 12 to be inserted over the fasteners and slid into final position before the fasteners are secured. The fasteners may be wood screws, metal screws, machine screws, nails, etc., depending on the substrate. However, the junction box 10 is also designed so that it can be mounted to an external substrate in its desired location after the mounting plate 14 is installed. Specifically, four relatively large access openings 72 are spaced near the corners of the mounting plate 14 so that, when the mounting plate 14 is installed in the base enclosure 12, the access openings 72 allow access to the keyhole openings 70 so that fasteners can be secured or removed. Installing the mounting plate 14 on stand-offs 64 within the base enclosure 12 ensures that there is sufficient clearance for the heads of the fasteners that secure the base enclosure 12 to the external substrate.

Figure 3:
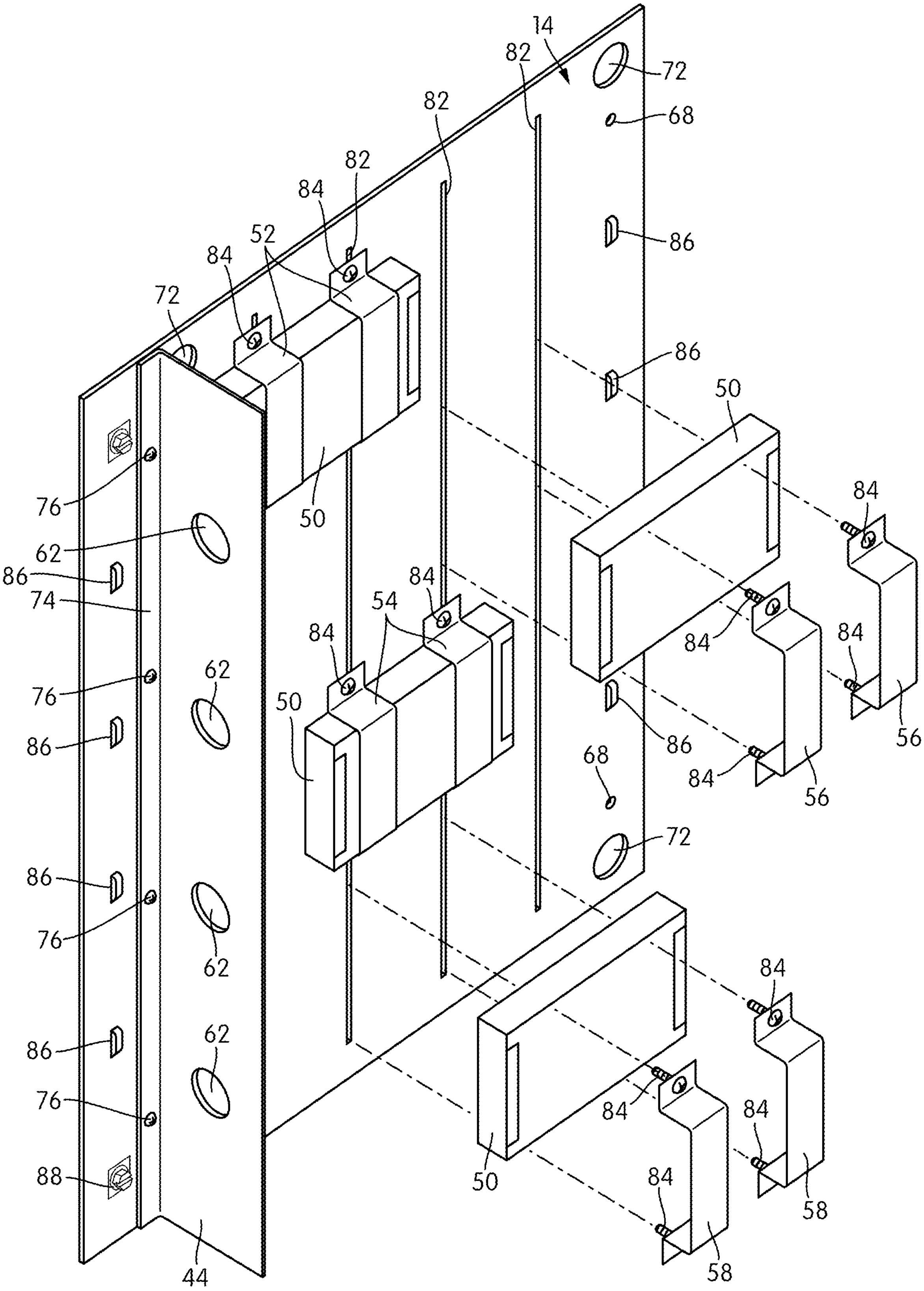
FIG. 3 is a partially-exploded perspective view of the mounting plate of the junction box of FIG. 1, shown in isolation.

FIG. 3 is a partially-exploded perspective view of the mounting plate 14 in isolation, illustrating the installation of several components on the mounting plate 14. First, as shown in both FIGS. 2 and 3, the dividing wall 44 makes a right angle at its bottom, forming a small connecting flange 74. Fasteners 76 pass through fastener openings 80 in the connecting flange 74 and are secured in openings 78 in the mounting plate 14. The openings 78 may be threaded to receive the fasteners 76, or securing structure (e.g., nuts) may be used.

In the view of FIG. 3, two of the drivers 50 and their securing mounting brackets 56, 58 are exploded away from the mounting plate 14. As can be seen in FIGS. 1-3, the mounting plate 14 defines four separate, parallel mounting slots 82 spaced from one another across the width of the mounting plate 14. Each one of the mounting slots 82 is of the same length and extends at least the majority of a height of the mounting plate 14. In this embodiment, the mounting slots 82 extend nearly the entirety of the height of the mounting plate 14, each of them terminating at the same point just in from the upper and lower edges of the mounting plate 14. Each mounting slot 82 has a width suitable to accept a fastener 84, which is secured on the underside of the mounting plate 14 with a nut (not shown in the figures). In the illustrated embodiment, each mounting slot 82 is of constant width. In other embodiments, the mounting slots may vary in width along their lengths, as along as adjacent slots vary in the same manner, such that at any point along the mounting slots, adjacent mounting slots have the same width. The mounting slots 82 are typically used in sets of two. In other words, while the mounting plate 14 has four mounting slots 82, a mounting plate 14 may have two mounting slots 82, six mounting slots 82, eight mounting slots 82, etc. That said, in some cases, a driver may be of sufficiently small dimension (or a bracket may be sufficiently large) to hold a driver using only one mounting slot 82.

As shown in FIGS. 2 and 3, all of the mounting slots 82 are positioned to one side of the divider 44. This allows all of the drivers 50 to be held together in the main compartment of the junction box 10 with high-voltage connections made in the compartment 46 defined by the dividing wall 44.

The slot-based driver mounting arrangement shown in the figures means that drivers 50 need not be secured in discrete, fixed locations. Instead, a driver 50 can be secured anywhere along the mounting slots 82. As shown in FIGS. 1-3, drivers 50 can be staggered in position along the mounting slots 82 so as to fit more drivers 50 in the junction box 10. Additionally, while all of the drivers 50 are the same size in this embodiment, the mounting slots 82 can mount and support drivers of different sizes. For example, a longer driver might be secured with the help of three U-brackets to three of the mounting slots 82. Many small drivers could also be spaced more closely together along the mounting slots 82. In short, the mounting slots 82 provide an adaptable mounting solution that allows multiple drivers of disparate shapes and sizes to share the same junction box 10. This is particularly convenient when some LED circuits may require more power than others.

The mounting plate 14 also includes features for wire and cable management. More specifically, a row of tie-downs 86 is positioned near each of the left and right edges of the mounting plate 14. In the illustrated embodiment, each tie-down 86 is partially punched out of the material of the mounting plate 14, leaving a structure through which a cable tie can be passed to secure wires or cables in place. As shown particularly in FIG. 3, there are four tie-downs 86 in a vertical row along each of the left and right sides in this embodiment.

The mounting plate 14 also carries a grounding screw 88. The grounding screw 88 is held within a threaded hole and is adapted to secure the end of a grounding wire or lug to the mounting plate 14. When the mounting plate 14 is secured to the base enclosure 12 with a grounding wire secured to the grounding screw 88, the entire junction box 10 is grounded. The grounding screw 88 may be painted, anodized, or otherwise given a specific color, such as green, to indicate its function.

Figure 4:
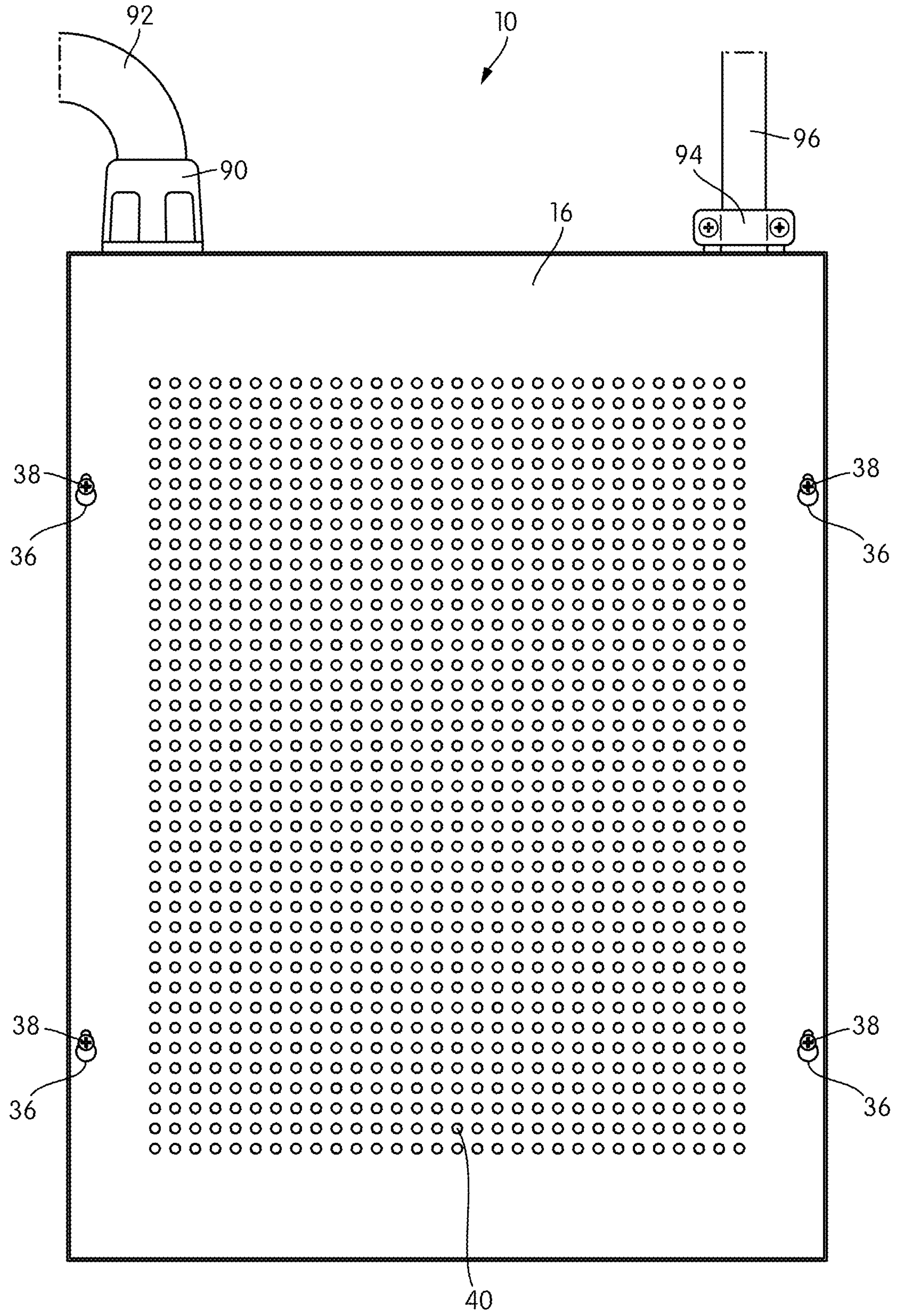
FIG. 4 is a front elevational view of the junction box of FIG. 1, shown in a configuration of use.

FIG. 4 is a front elevational view of the junction box 10 as it might appear fully configured and installed. Notably, the lid 16 has been installed over the front of the junction box 10. Two knock outs 42 have been removed at the top of the junction box 10. In this embodiment, a first connector 90 is secured in the opening made by the removal of a knock out 42. A cable 92 brings high-voltage power into the connection compartment 46. On the other side of the junction box 10, a clamp 94 is secured in another opening created by the removal of a knock out 42 and itself secures a low-voltage cable 96 that brings power to LED circuits.

In the illustrated embodiment, the junction box 10 and its major components are made of sheet metal, such as sheet steel, which is folded, punched, and otherwise manipulated to form the features described here. In other embodiments, the junction box 10 may be made by casting a metal, molding a plastic, or machining blocks, sheets, billets, or other bulk forms of material. Any plastics used to make a junction box 10 may be required to pass various flame retardancy tests.

Junction boxes according to embodiments of the invention may have any shape. If the junction box is rectilinear, as is the junction box 10 described above, it may have any number of sides and a plurality of sidewalls. However, the junction box 10 may be round or, at least, have curved sides. In particular, if the junction box 10 is round, it may have only a single, contiguous sidewall.

While the invention has been described with respect to certain embodiments, the description is intended to be exemplary, rather than limiting. Modifications and changes may be made within the scope of the invention, which is defined by the appended claims.

What is claimed is:

1. A junction box, comprising:
- a base enclosure having a back and a sidewall or plurality of sidewalls arising from respective edges of the back, thereby defining an opening;
- a mounting plate adapted to be removably mounted within, and removed from, the base enclosure, the mounting plate including
  - at least one set of mutually parallel mounting slots extending across substantially the entirety of the mounting plate along a first direction, and
  - a divider extending outwardly from the mounting plate, the divider positioned to one side of the at least one set of mounting slots; and
- a lid adapted to be installed over the base enclosure to close the opening therein:
- wherein the base enclosure further comprises mounting openings in the back therein, and the mounting plate includes access holes positioned such that, when the mounting plate is removably mounted within the base enclosure, the mounting openings in the back are accessible through the access holes in the mounting plate.

2. The junction box of claim 1, wherein the divider has at least one opening or a knock-out for an opening.

3. The junction box of claim 1, wherein the mounting plate is adapted to be removably mounted on stand-offs secured to the back of the base enclosure.

4. The junction box of claim 1, wherein the divider is attached to the mounting plate with fasteners.

5. The junction box of claim 1, wherein the mounting plate further includes a grounding screw mounted within a threaded opening.

6. The junction box of claim 1, wherein the lid includes a perforated portion.

7. The junction box of claim 1, wherein, when the mounting plate is mounted within the base enclosure, the junction box has a main compartment sized to accept one or more drivers and a connection compartment adapted for making wire connections, the main compartment and the connection compartment divided from one another, at least in part, by the divider on the mounting plate.

8. The junction box of claim 7, wherein the divider has at least one opening or a knock-out for an opening.

9. The junction box of claim 1, wherein the mounting plate has one or more tie downs thereon.

10. A method, comprising:

installing one or more drivers by securing the drivers with securing structure in at least one set of mutually parallel mounting slots that extend substantially the entirety of a mounting plate along a first direction;

placing ends of at least one set of high-voltage wires from the one or more drivers through one or more openings in a divider that extends outwardly from the mounting plate on one side of the at least one set of mutually parallel mounting slots; and mounting the mounting plate within a base enclosure of a junction box, the base enclosure having a back and a sidewall or plurality of sidewalls arising from respective edges of the back, thereby defining an opening.

11. The method of claim 10, further comprising installing a lid over the opening defined by the base enclosure.

12. The method of claim 11, wherein said installing further comprises securing the drivers in staggered fashion across multiple sets of the mutually parallel mounting slots.

13. The method of claim 12, wherein the securing structure comprises a bracket.

14. A junction box, comprising:

a base enclosure having a back and a sidewall or plurality of sidewalls arising from respective edges of the back, thereby defining an opening;

a mounting plate adapted to be removably mounted within, and removed from, the base enclosure, the mounting plate including at least one set of mutually parallel mounting slots extending across substantially the entirety of the mounting plate along a first direction, and a divider extending outwardly from the mounting plate, the divider positioned to one side of the at least one set of mounting slots; and a lid adapted to be installed over the base enclosure to close the opening therein;

wherein, when the mounting plate is mounted within the base enclosure, the junction box has a main compartment sized to accept one or more drivers and a connection compartment adapted for making wire connections, the main compartment and the connection compartment divided from one another, at least in part, by the divider on the mounting plate.

15. The junction box of claim 14, wherein the divider has at least one opening or a knock-out for an opening.

16. The junction box of claim 14, wherein the mounting plate is adapted to be removably mounted on stand-offs secured to the back of the base enclosure.

17. The junction box of claim 14, wherein the divider is attached to the mounting plate with fasteners.

18. The junction box of claim 14, wherein the mounting plate further includes a grounding screw mounted within a threaded opening.

19. The junction box of claim 14, wherein the lid includes a perforated portion.

20. A junction box, comprising:

a base enclosure having a back and a sidewall or plurality of sidewalls arising from respective edges of the back, thereby defining an opening;

a mounting plate adapted to be removably mounted within, and removed from, the base enclosure, the mounting plate including at least one set of mutually parallel mounting slots extending across substantially the entirety of the mounting plate along a first direction, and a divider extending outwardly from the mounting plate, the divider positioned to one side of the at least one set of mounting slots; and a lid adapted to be installed over the base enclosure to close the opening therein;

wherein the mounting plate has one or more tie downs thereon.

21. The junction box of claim 20, wherein the divider has at least one opening or a knock-out for an opening.

22. The junction box of claim 20, wherein the mounting plate is adapted to be removably mounted on stand-offs secured to the back of the base enclosure.

23. The junction box of claim 20, wherein the divider is attached to the mounting plate with fasteners.

24. The junction box of claim 20, wherein the mounting plate further includes a grounding screw mounted within a threaded opening.

25. The junction box of claim 20, wherein the lid includes a perforated portion.

26. The junction box of claim 20, wherein, when the mounting plate is mounted within the base enclosure, the junction box has a main compartment sized to accept one or more drivers and a connection compartment adapted for making wire connections, the main compartment and the connection compartment divided from one another, at least in part, by the divider on the mounting plate.

* * * * *